United States Patent
Kato

(10) Patent No.: US 9,752,901 B2
(45) Date of Patent: Sep. 5, 2017

(54) SCALE AND OPTICAL ENCODER

(71) Applicant: Mitutoyo Corporation, Kawasaki, Kanagawa (JP)

(72) Inventor: Yoshiaki Kato, Urayasu (JP)

(73) Assignee: MITUTOYO CORPORATION, Kawasaki (JP)

( * ) Notice: Subject to any disclaimer, the term of this patent is extended or adjusted under 35 U.S.C. 154(b) by 199 days.

(21) Appl. No.: 14/721,455

(22) Filed: May 26, 2015

(65) Prior Publication Data

US 2015/0346000 A1    Dec. 3, 2015

(30) Foreign Application Priority Data

May 27, 2014    (JP) ................................. 2014-108679

(51) Int. Cl.
    *G01D 5/347*    (2006.01)
    *G01D 5/244*    (2006.01)

(52) U.S. Cl.
    CPC ..... *G01D 5/34715* (2013.01); *G01D 5/24438* (2013.01); *G01D 5/347* (2013.01)

(58) Field of Classification Search
    CPC ........... G01D 5/34746; G01D 5/34715; G01D 5/34707; G01D 5/347; G01D 5/24428; G01D 5/24433; G01D 5/24438
    See application file for complete search history.

(56) References Cited

U.S. PATENT DOCUMENTS

| | | | | | |
|---|---|---|---|---|---|
| 4,602,436 | A | * | 7/1986 | Ernst | G01D 5/36 250/237 G |
| 4,912,322 | A | * | 3/1990 | Ichikawa | G01D 5/36 250/231.13 |
| 4,979,827 | A | * | 12/1990 | Matsui | G01D 5/38 250/237 G |
| 5,456,021 | A | * | 10/1995 | Nelle | H03M 1/287 250/237 G |
| 5,994,692 | A | * | 11/1999 | Holzapfel | G01D 5/38 250/237 G |
| 6,664,535 | B1 | * | 12/2003 | Nahum | G01D 5/34792 250/231.14 |
| 7,002,137 | B2 | * | 2/2006 | Thorburn | G01D 5/34792 250/231.13 |

(Continued)

FOREIGN PATENT DOCUMENTS

JP    2003-083771    3/2003

*Primary Examiner* — John Lee
(74) *Attorney, Agent, or Firm* — Rankin, Hill & Clark LLP

(57) ABSTRACT

A scale and an optical encoder capable of maintaining an accuracy of a reference position irrespective of an error in attaching a detection head are provided. The scale according to the present invention is a scale including main-signal scale gratings having grating patterns of a predetermined pitch, and a reference-signal pattern, in which the main-signal scale gratings are arranged in parallel in a direction perpendicular to a length measurement axis of the main-signal scale gratings and are different from each other in phase by ½, and the reference-signal pattern is formed on the length measurement axis of the main-signal scale gratings. The optical encoder according to the present invention includes a light source, main-signal light source gratings, reference-signal light source gratings, main-signal receiver gratings, and a reference-signal receiver element.

9 Claims, 14 Drawing Sheets

(56) References Cited

U.S. PATENT DOCUMENTS

| | | | |
|---|---|---|---|
| 7,312,437 B2 | 12/2007 | Hane | |
| 7,348,546 B2* | 3/2008 | Schoser | G01D 5/34746 250/231.13 |
| 7,485,845 B2* | 2/2009 | Yaku | G01D 5/34746 250/231.13 |
| 7,619,208 B2* | 11/2009 | Masada | G01D 5/34707 250/231.13 |
| 7,667,188 B2* | 2/2010 | Tovar | G01D 5/2457 250/231.13 |
| 7,825,369 B2 | 11/2010 | Hane | |
| 7,907,286 B2* | 3/2011 | Holzapfel | G01D 5/34723 250/231.16 |
| 8,227,744 B2* | 7/2012 | Kusano | G01D 5/34746 250/231.13 |
| 8,395,535 B2* | 3/2013 | Kawada | G01D 5/2457 250/231.13 |
| 8,729,458 B2* | 5/2014 | Kato | G01D 5/24476 250/231.1 |
| 8,941,052 B2* | 1/2015 | Xie | G01D 5/34792 250/231.13 |
| 9,243,895 B2* | 1/2016 | Allen | G01D 5/34746 |
| 9,383,231 B2* | 7/2016 | Yaku | G01D 5/34723 |
| 9,534,936 B2* | 1/2017 | Kimura | G01D 5/24438 |
| 9,557,193 B2* | 1/2017 | Kato | G01D 5/34707 |
| 2002/0074487 A1* | 6/2002 | Ito | G01D 5/34746 250/231.13 |
| 2004/0135077 A1 | 7/2004 | Hane | |
| 2007/0125939 A1* | 6/2007 | Yaku | G01D 5/34746 250/231.16 |
| 2011/0272564 A1* | 11/2011 | Kawada | G01D 5/2457 250/231.1 |
| 2012/0085897 A1* | 4/2012 | Kato | G01D 5/24476 250/231.1 |
| 2013/0206970 A1* | 8/2013 | Tahara | G01D 5/34746 250/231.1 |
| 2014/0263987 A1* | 9/2014 | Tobiason | G01D 5/34715 250/231.1 |
| 2015/0177027 A1* | 6/2015 | Kato | G01D 5/34707 250/231.1 |
| 2015/0346000 A1* | 12/2015 | Kato | G01D 5/24438 250/231.1 |
| 2016/0153812 A1* | 6/2016 | Kato | G01D 5/34715 250/231.1 |
| 2016/0209246 A1* | 7/2016 | Kato | G01D 5/24438 |
| 2016/0363464 A1* | 12/2016 | Kato | G01D 5/34715 |

* cited by examiner

SCALE AND OPTICAL ENCODER

INCORPORATION BY REFERENCE

This application is based upon and claims the benefit of priority from Japanese patent application No. 2014-108679, filed on May 27, 2014, the disclosure of which is incorporated herein in its entirety by reference.

BACKGROUND OF THE INVENTION

1. Field of the Invention

The present invention relates to a scale and an optical encoder.

2. Description of Related Art

An optical encoder including a scale and a detection head that moves along the scale has been used, for example, for measurement of a moving distance in a manufacturing device. Japanese Patent No. 4274751 discloses an optical encoder including a scale in which displacement detection patterns (main-signal scale gratings) and reference position detection patterns (reference-signal scale gratings) are arranged in parallel in a direction perpendicular to a length measurement axis.

As shown in FIG. 12, an optical encoder 7 disclosed in Japanese Patent No. 4274751 includes a scale 70 and a detection head 80 that relatively moves along the scale 70. FIG. 13 is a plane view of the scale 70.

As shown in FIG. 13, in the scale 70, displacement detection patterns 71 and a reference position detection pattern 72 are arranged in parallel in a direction (Y-axis direction) perpendicular to a length measurement axis (X-axis direction). In the displacement detection patterns 71, transmitting parts 73 and non-transmitting parts 74 are alternately arranged along the length measurement direction (X-axis direction) of the scale 70.

As shown in FIG. 12, the detection head 80 includes a light source 31, light source gratings 81 arranged between the scale 70 and the light source 31, and a light receiving part 82 arranged in a position opposed to the light source grating 81 with the scale 70 interposed therebetween. In the light receiving part 82, receiver gratings 83 and a reference-signal receiver element 84 are arranged in parallel to each other.

The light source 31 emits light to the light source gratings 81, and the light that has passed through the light source gratings 81 is made incident on the scale 70. The light that has been made incident on the scale 70 is diffracted by the displacement detection patterns 71 and the reference position detection pattern 72, a main-signal interference fringe is generated by the displacement detection patterns 71, and a reference-signal interference fringe is generated by the reference position detection pattern 72. The main-signal interference fringe is detected by the receiver gratings 83 and the reference-signal interference fringe is detected by the reference-signal receiver element 84.

The optical encoder 7 disclosed in Japanese Patent No. 4274751 reads an increase and a decrease in the luminance of the main-signal interference fringes when the detection head 80 moves along the scale 70 to measure the number of main-signal interference fringes by which the detection head 80 has moved from a measurement start position. Further, the reference-signal receiver element 84 detects the reference-signal interference fringe to set the position at which the reference-signal interference fringe has been detected as a reference position for measuring a moving distance. In this way, it is possible to measure the current position of the detection head 80 based on the reference position and the moving distance from the measurement start position.

SUMMARY OF THE INVENTION

For the sake of clarity of the description, as one example, it is assumed that, as shown in FIG. 13, the position of a receiver grating 83A of the light receiving part 82 in the X-axis direction and that of the reference-signal receiver element 84 in the X-axis direction are equal to each other. Accordingly, the phase of the main-signal interference fringe detected by the receiver grating 83 when the reference-signal interference fringe is detected by the reference-signal receiver element 84 is set to the reference position for measuring the moving distance. Since the configuration shown in FIG. 13 has been employed here, the phase of the main-signal interference fringe when the reference position is detected is set to 0°. Next, a case in which the detection head 80 has a rotation deviation in the yaw direction with respect to the scale 70 will be considered. The yaw direction means a direction in which the detection head 80 rotates around the Z axis in FIG. 13.

FIG. 14 shows a state in which the detection head 80 has a rotation deviation in the yaw direction with respect to the scale 70. When the reference-signal interference fringe is detected by the reference-signal receiver element 84, the receiver grating 83A of the light receiving part 82 is shifted in the X-axis direction. When there is no rotation deviation, the phase of the main signal when the reference signal is detected is 0°. On the other hand, when the detection head 80 has a rotation deviation, the phase of the main signal when the reference signal is detected is shifted to AO. As described above, since the phase of the main signal when the reference signal is detected is deviated, an error is included in the moving distance of the detection head 80 from the reference position.

The present invention aims to provide a scale and an optical encoder capable of maintaining an accuracy of a reference position irrespective of an error in attaching a detection head.

A scale according to the present invention is a scale including two main-signal scale gratings having grating patterns of a predetermined pitch, and a reference-signal pattern, in which: the two main-signal scale gratings are arranged in parallel in a direction perpendicular to a length measurement axis of the two main-signal scale gratings and are different from each other in phase by ½, and the reference-signal pattern is formed on the length measurement axis of the main-signal scale grating.

In the present invention, it is preferable that a part of the grating patterns of the main-signal scale gratings is disturbed, whereby the reference-signal pattern is formed.

In the present invention, it is preferable that the reference-signal pattern extends to cross the two main-signal scale gratings in a direction perpendicular to the length measurement axis of the scale, and the reference-signal pattern does not disturb the grating patterns for one main-signal scale grating and disturbs the grating patterns for the other main-signal scale grating.

In the present invention, it is preferable that the reference-signal pattern includes a non-transmitting part that extends in the direction perpendicular to the length measurement axis of the scale and interrupts light, and the length of the reference-signal pattern in the length measurement direction is equal to the length of half the cycle of the pitch of the main-signal scale gratings.

In the present invention, it is preferable that the reference-signal pattern is a transmitting part extending in the direction perpendicular to the length measurement axis of the scale.

In the present invention, it is preferable that a plurality of the reference-signal patterns are provided.

In the present invention, it is preferable that the two main-signal scale gratings arranged in parallel form one pair, and a plurality of pairs of the two main-signal scale gratings are arranged in parallel in the direction perpendicular to the length measurement axis of the scale.

An optical encoder according to the present invention includes: the aforementioned scale; a light source; main-signal light source gratings that are arranged between the light source and the scale to form a main-signal interference fringe in collaboration with the main-signal scale gratings; reference-signal light source gratings that are arranged between the light source and the scale to form a reference-signal interference fringe in collaboration with the reference-signal pattern; main-signal detection means that detects a main signal from the main-signal interference fringe; and reference-signal detection means that detects a reference signal from the reference-signal interference fringe, in which: the main-signal light source gratings include gratings formed to have a pitch so that two or more interference fringes formed by the two or more main-signal scale gratings and the main-signal light source gratings have the same phase, and the reference-signal light source gratings include gratings formed to have a pitch so that two or more interference fringes formed by the two or more main-signal scale gratings and the reference-signal light source grating are different from each other in phase by ½.

In the present invention, it is preferable that the main-signal light source gratings and the reference-signal light source gratings are arranged in parallel to each other in a length measurement direction of the scale, the main-signal detection means is arranged in parallel so as to be opposed to the main-signal light source gratings with the scale interposed therebetween, and the reference-signal detection means is arranged so as to be opposed to the reference-signal light source gratings with the scale interposed therebetween.

According to the present invention, it is possible to provide a scale and an optical encoder capable of maintaining an accuracy of a reference position irrespective of an error in attaching a detection head.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Embodiment

With reference to FIGS. 1 to 6, an optical encoder according to a first embodiment of the present invention will be described.

Figure 1:
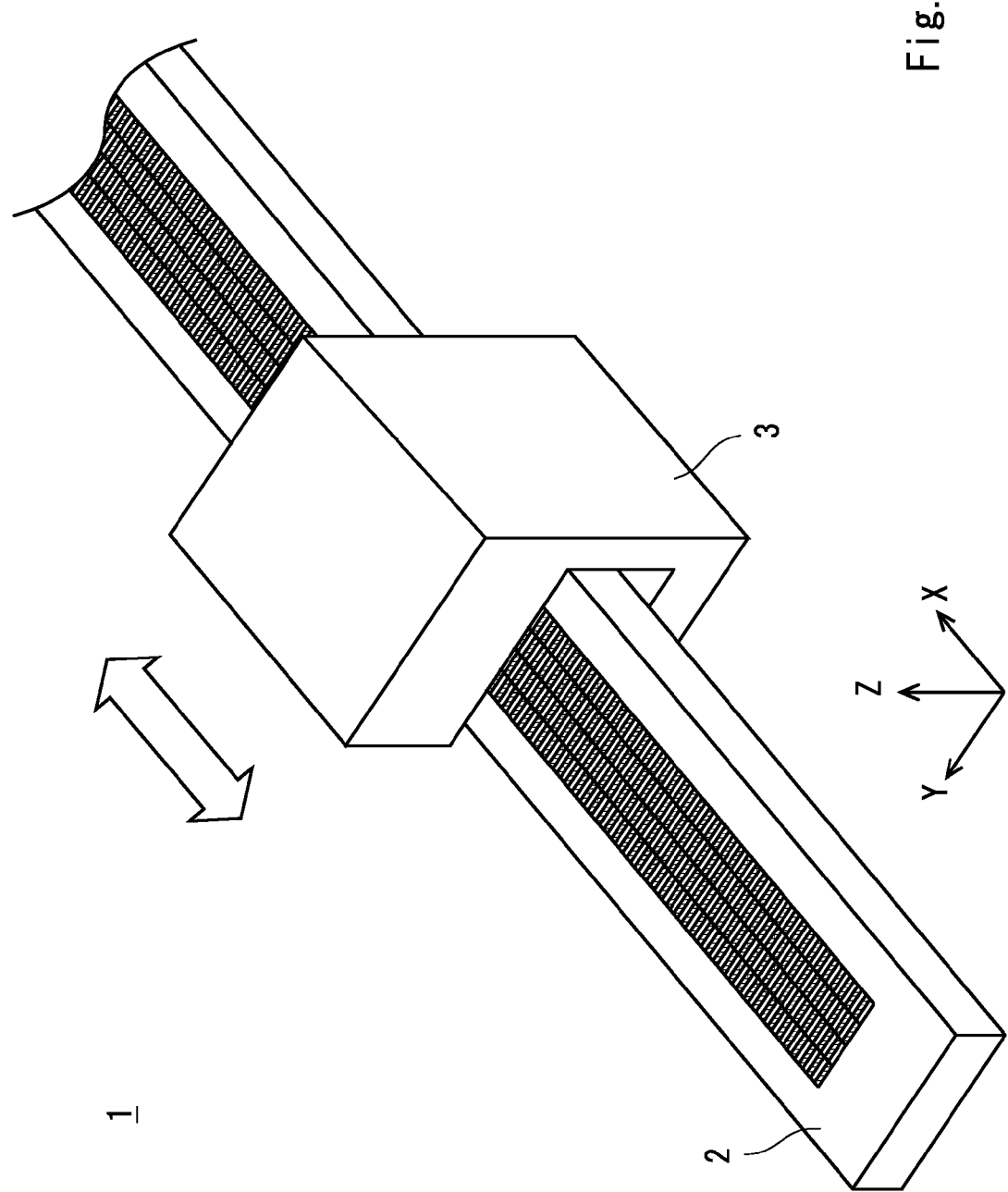
FIG. 1 is a perspective view showing an optical encoder according to a first embodiment.
Figure 2:
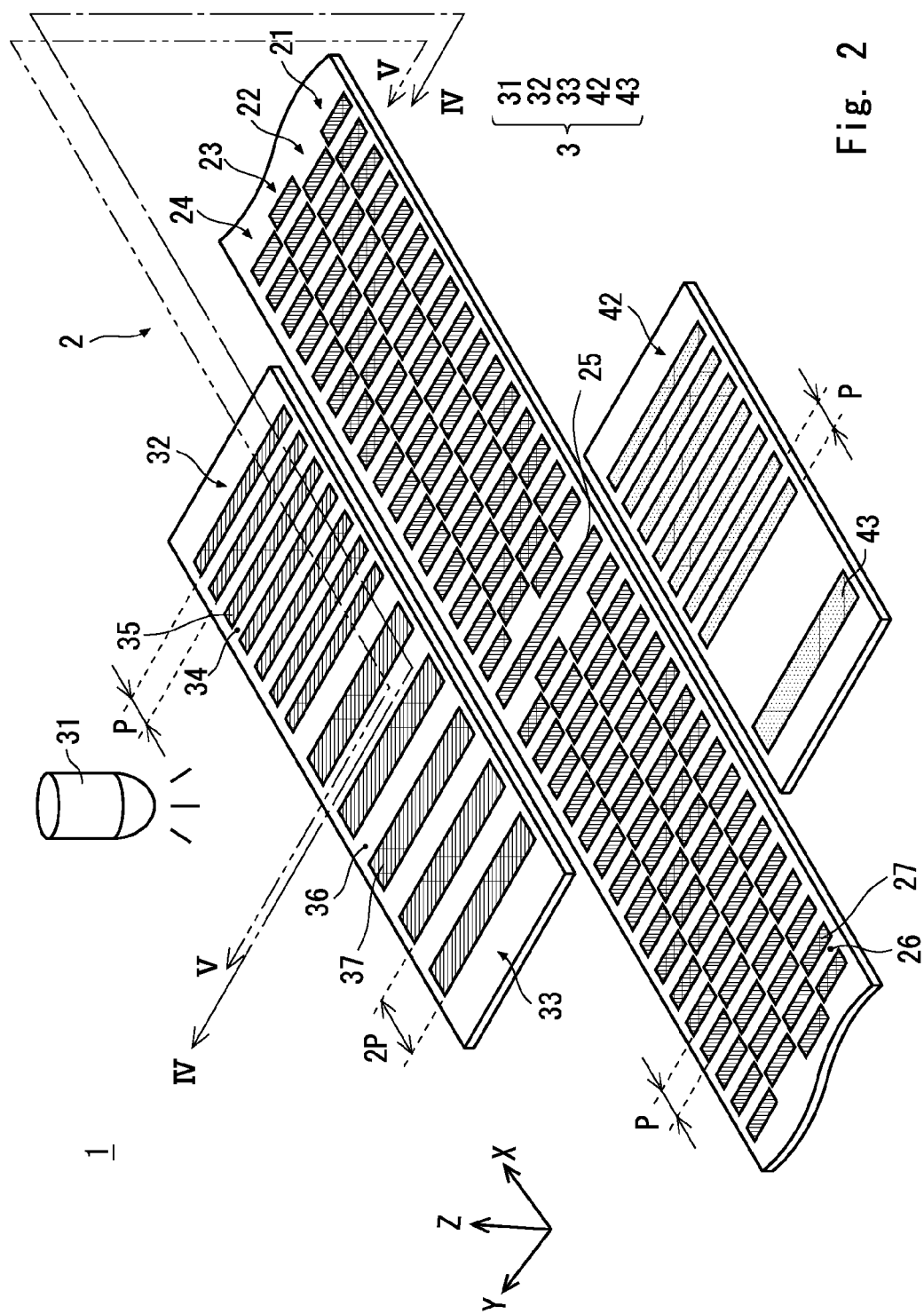
FIG. 2 is a perspective view showing the optical encoder according to the first embodiment.
Figure 3:
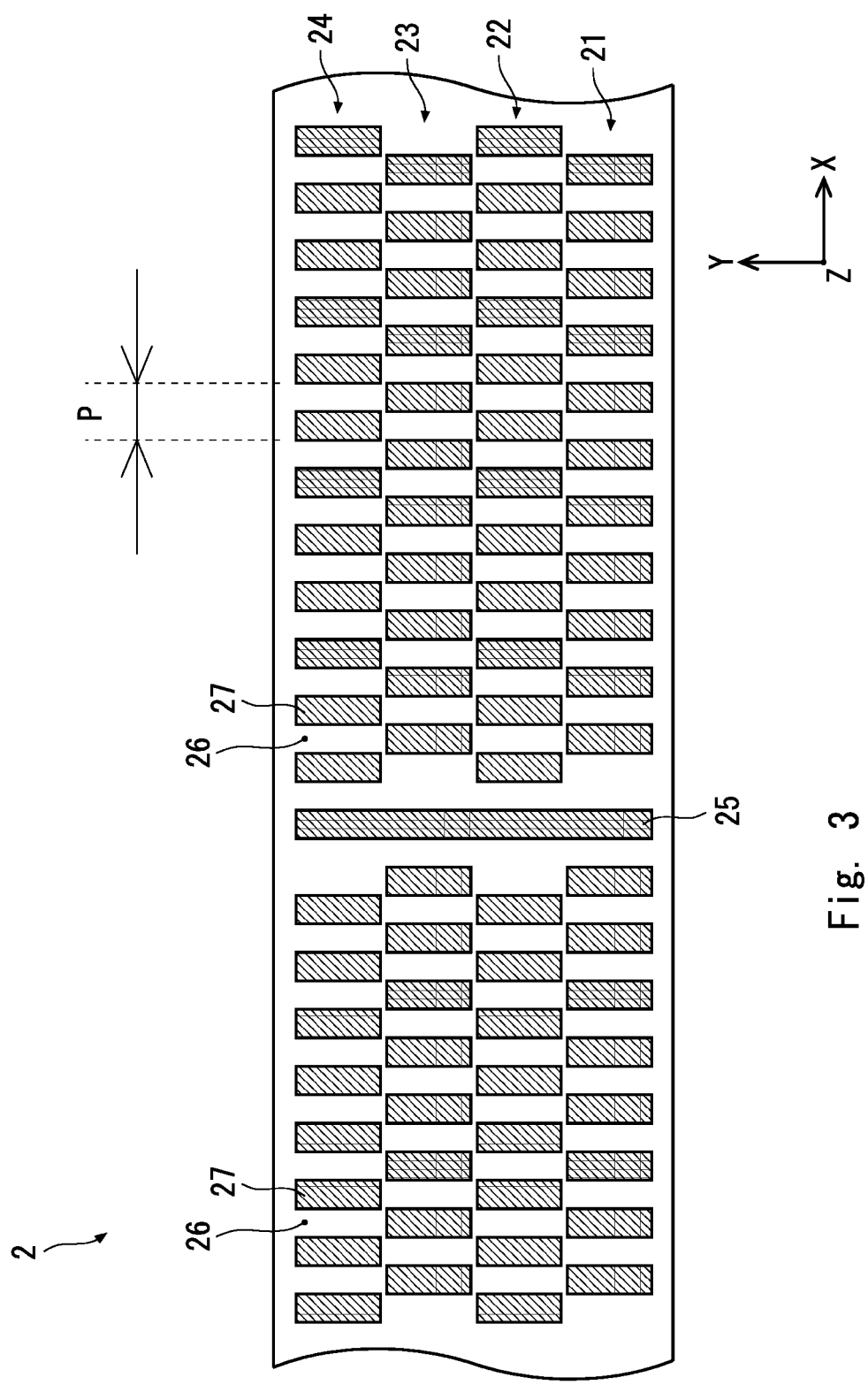
FIG. 3 is a plane view showing a scale according to the first embodiment.

As shown in FIG. 1, an optical encoder 1 includes a scale 2 and a detection head 3 that relatively moves along the scale 2. The interior of the detection head 3 and the structure of the scale 2 are shown in FIG. 2 in detail. FIG. 3 is a plane view of the scale 2.

As shown in FIGS. 2 and 3, the scale 2 includes main-signal scale gratings 21 to 24 and a reference-signal pattern 25. The main-signal scale gratings 21 to 24 include grating patterns having a predetermined pitch P. In the grating patterns, light parts and dark parts of transmitting parts 26 and non-transmitting parts 27 are included in the pitch P, and the light parts and the dark parts are alternately arranged along a length measurement direction (X-axis direction). The length of the transmitting parts 26 and the non-transmitting parts 27 in the length measurement direction (X-axis direction) is P/2.

As to the non-transmitting part 27, it has a width of P/2, and a plurality of non-transmitting parts 27 are aligned in the X-axis direction with the intervals of P/2. Further, as to the transmitting part 26, a plurality of transmitting parts 26 are aligned in the X-axis direction with the intervals of P/2.

In this embodiment (FIG. 3), the grating patterns may be shifted by P/2, and in FIG. 3, the grating patterns are shifted by half a cycle (P/2) in the +X direction side and the −X direction side with respect to the reference-signal pattern 25. The reason therefor will be described later with reference to FIGS. 4 and 5.

The main-signal scale gratings 21 to 24 are arranged in parallel in a width direction (Y-axis direction) of the scale 2, and the adjacent main-signal scale gratings are different from each other in phase by ½. The main-signal scale gratings 21 to 24 are staggered as a whole. In this embodiment, the non-transmitting parts are staggered. Since the transmitting parts and the non-transmitting parts may be replaced by each other, the transmitting parts may be staggered.

The reference-signal pattern 25 is formed on the length measurement axis of the main-signal scale gratings 21 to 24 that are arranged in parallel. The reference-signal pattern 25 is formed by removing the main-signal scale gratings 21 to 24 for one pitch and arranging one non-transmitting part extending across the four main-signal scale gratings 21 to 24 in the −X direction side of the removed area.

From another point of view, it can also be considered that a part of the grating patterns of the main-signal scale gratings 21 to 24 arranged in parallel is disturbed, whereby the reference-signal pattern 25 is formed. Since the reference-signal pattern 25 is one non-transmitting part, the grating patterns are not shifted when seen from the main-signal scale gratings 21 and 23 on the −X direction side of the reference-signal pattern 25, whereas the grating patterns are shifted by P/2 in the +X direction when seen from the main-signal scale gratings 22 and 24. Meanwhile, the grating patterns are not shifted when seen from the main-signal scale gratings 22 and 24 on the +X direction side of the reference-signal pattern 25, whereas the grating patterns are shifted by P/2 in the −X direction when seen from the main-signal scale gratings 21 and 23.

As shown in FIG. 2, the detection head 3 includes a light source 31, main-signal light source gratings 32, reference-signal light source gratings 33, main-signal receiver gratings 42, and reference-signal receiver elements 43. The main-signal light source gratings 32 and the reference-signal light source gratings 33 are arranged in parallel in the length measurement direction in such a way that they are opposed to one surface of the scale 2. The main-signal receiver gratings 42 and the reference-signal receiver elements 43 are arranged in parallel in the length measurement direction in such a way that they are opposed to the other surface of the scale 2.

The pitch of the main-signal light source gratings 32 and the main-signal receiver gratings 42 is different from the pitch of the reference-signal light source gratings 33 and the reference-signal receiver elements 43. It is therefore possible to detect a main signal and a reference signal in a separate manner from the interference fringes generated by the reference-signal pattern 25 and the main-signal scale gratings 21 to 24 formed on the length measurement axis.

The light source 31 emits light to the main-signal light source gratings 32 and the reference-signal light source gratings 33. A Light Emitting Diode (LED), a semiconductor laser, a Self-Scanning Light Emitting Device (LED), an Organic light-emitting diode (OLED) may be used, for example, as the light source 31.

The main-signal light source gratings 32 are arranged between the light source 31 and the scale 2 and include transmitting parts 34 and non-transmitting parts 35 alternately arranged along the length measurement axis of the scale 2. The pitch of the main-signal light source gratings 32 is equal to the pitch P of the main-signal scale gratings 21 to 24. The main-signal light source gratings 32 form main-signal interference fringes in collaboration with the main-signal scale gratings 21 to 24. The four interference fringes formed by the main-signal scale gratings 21 to 24 and the main-signal light source gratings 32 have the same phase (the reason why they have the same phase will be described later with reference to FIGS. 4 and 5.)

The reference-signal light source gratings 33 are arranged between the light source 31 and the scale 2, and include transmitting parts 36 and non-transmitting parts 37 alternately arranged along the length measurement axis of the scale 2. The pitch of the reference-signal light source gratings 33 is twice as large as the pitch P of the main-signal scale gratings 21 to 24. The pitch of the reference-signal light source gratings 33 may be an even multiple of the pitch P of the main-signal scale gratings 21 to 24. In this case, the pitch of the reference-signal light source gratings 33 is represented by 2NP, where N denotes a natural number N. The reference-signal light source gratings 33 form reference-signal interference fringes in collaboration with the reference-signal pattern 25. The four interference fringes formed by the reference-signal light source gratings 33 and the four main-signal scale gratings 21 to 24 are different from one another in phase by ½ (the reason why they are different from one another in phase by ½ will be described later with reference to FIGS. 6 and 7.)

The main-signal receiver gratings 42 (main-signal detection means) are opposed to the main-signal light source gratings 32 with the scale 2 interposed therebetween, and detect a main signal from the main-signal interference fringes. The pitch of the main-signal receiver gratings 42 is equal to the pitch P of the main-signal scale gratings 21 to 24 and the main-signal light source grating 32. The main-signal receiver gratings 42 are formed by a plurality of photodiodes having a width of P/2 and being arranged in parallel in the length measurement direction with the pitch P. The main-signal interference fringes having a pitch P are generated on the main-signal receiver gratings 42 by the main-signal scale gratings 21 to 24 and the main-signal light source gratings 32, and light that is incident on the main-signal receiver gratings 42 is converted into an electric signal. Further, the main-signal detection means may be gratings having a pitch P in the length measurement direction arranged on one planar photodiode.

The reference-signal receiver elements 43 (reference-signal detection means) are opposed to the reference-signal light source gratings 33 with the scale 2 interposed therebetween, and detect the reference signal from the reference-signal interference fringes. The width of a light receiving part of the reference-signal receiver element 43 is P. Further, the reference-signal detection means may be an opaque plate including one slit having a width P arranged on one planar photodiode.

Figure 4:
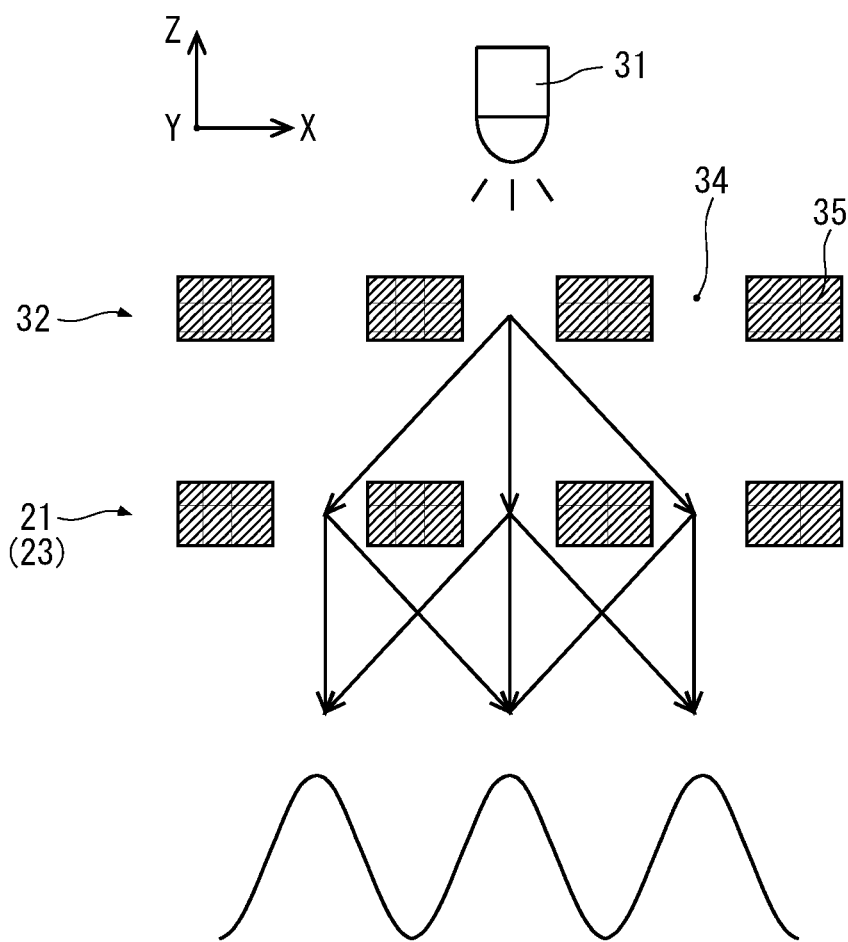
FIG. 4 is a first diagram for describing interference fringes generated by main-signal light source gratings and main-signal scale gratings in the optical encoder according to the first embodiment.
Figure 5:
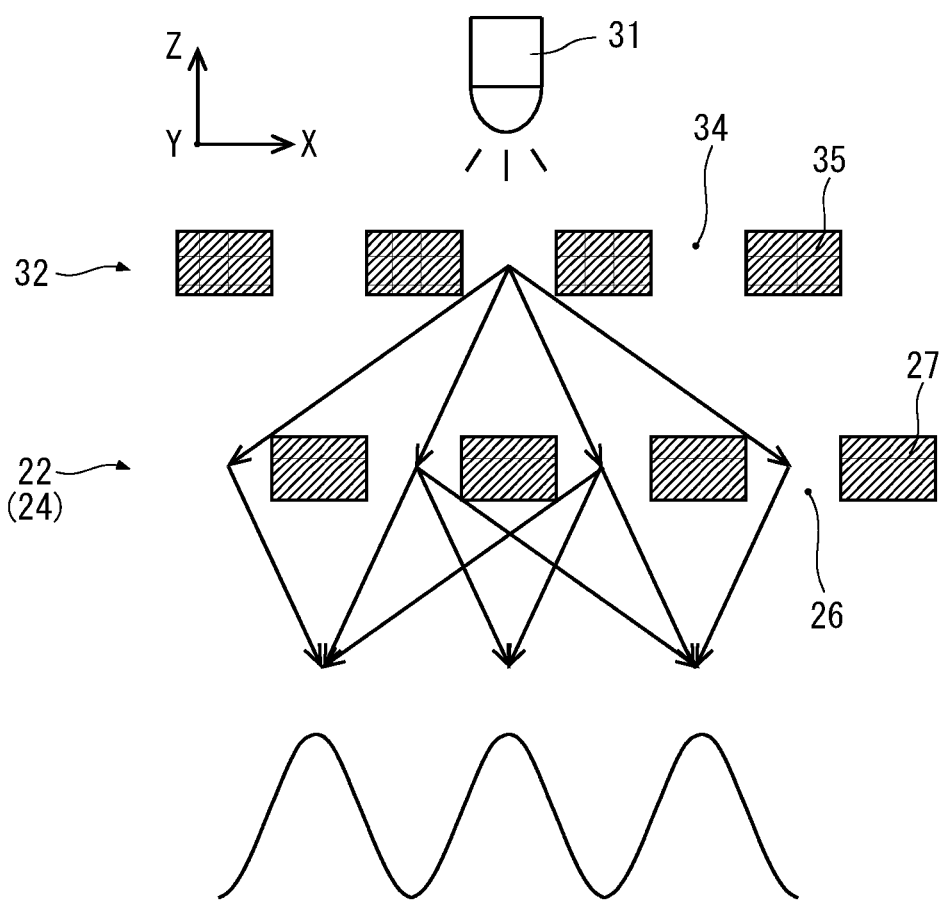
FIG. 5 is a second diagram for describing interference fringes generated by the main-signal light source gratings and the main-signal scale gratings in the optical encoder according to the first embodiment.
Figure 6:
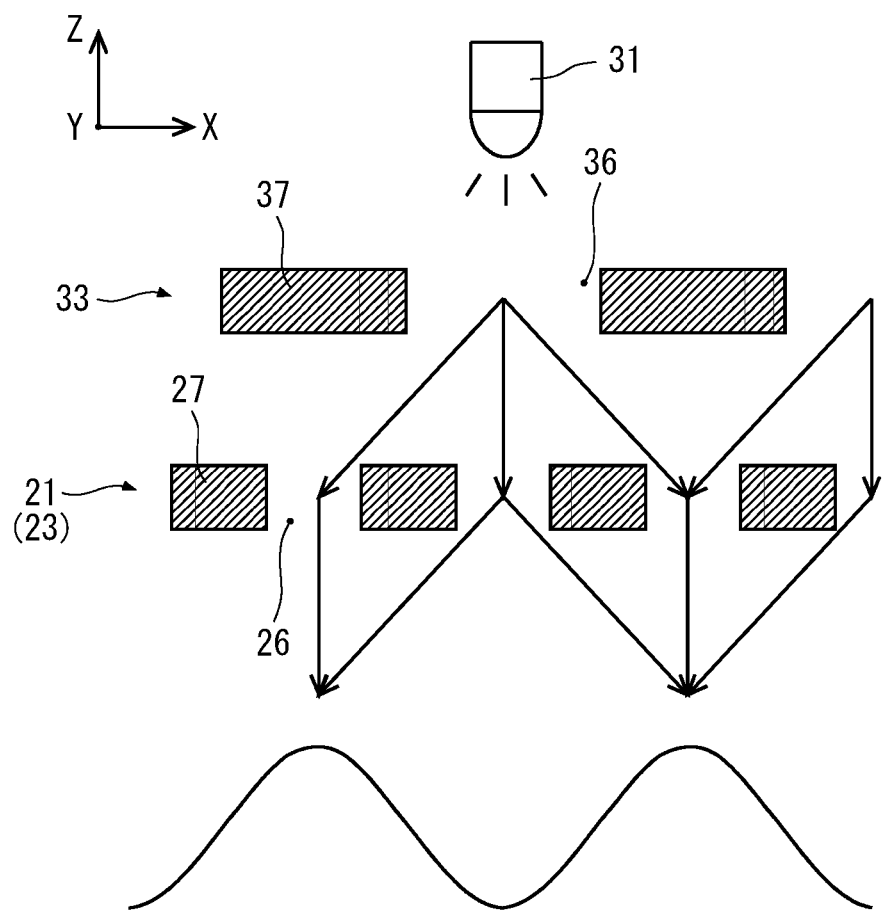
FIG. 6 is a first diagram for describing interference fringes generated by reference-signal light source gratings and the main-signal scale gratings in the optical encoder according to the first embodiment.

Referring next to FIGS. 4 to 6, an operation of the optical encoder 1 will be described.

First, referring to FIGS. 4 and 5, generation of the main signal for detecting the amount of movement of the detection head 3 with respect to the scale 2 will be described. FIG. 4 is an end view showing a cross section of the plane perpendicular to the main-signal scale grating 21. FIG. 5 is an end view showing a cross section of the plane perpendicular to the main-signal scale grating 22. As shown in FIG. 4, the light emitted from the light source 31 is diffracted when passing through the main-signal light source gratings 32 and behaves as multiple linear light sources arranged in the X-axis direction.

A state in which the main-signal scale gratings 21 to 24 and the main-signal light source gratings 32 are regularly aligned, that is, a state in which zeroth order light that has passed through the main-signal light source gratings 32 can pass through the main-signal scale gratings 21 to 24 as shown in FIG. 4, is referred to as a first positional relationship. As shown in FIG. 5, a state in which the main-signal light source gratings 32 and the main-signal scale gratings 21 to 24 are deviated from each other by half a pitch, that is, a state in which the zeroth order light that has passed through the main-signal light source gratings 32 is interrupted by the main-signal scale gratings 21 to 24, is referred to as a second positional relationship.

As shown in FIG. 2, in the scale 2, the main-signal scale gratings 21 to 24 are arranged in parallel in the width direction and the adjacent main-signal scale gratings are different from each other in phase by ½. Therefore, when the main-signal scale gratings 21 and 23 are in the first positional relationship with respect to the main-signal light source gratings 32, the main-signal scale gratings 22 and 24 are naturally in the second positional relationship. On the other hand, when the main-signal scale gratings 21 and 23 are in the second positional relationship with respect to the main-signal light source gratings 32, the main-signal scale gratings 22 and 24 are naturally in the first positional relationship.

The interference fringe generated when the scale 2 is in the first positional relationship is called a first main-signal interference fringe, and the interference fringe generated when the scale 2 is in the second positional relationship is called a second main-signal interference fringe. Since the pitch of the main-signal scale gratings 21 to 24 is equal to the pitch of the main-signal light source grating 32, the first main-signal interference fringe and the second main-signal interference fringe have the same phase.

Accordingly, in the optical encoder 1, the peak positions in the length measurement direction of the four main-signal interference fringes generated by the four main-signal scale gratings 21 to 24 are the same. Since the main-signal receiver gratings 42 do not have a resolution in the direction perpendicular to the length measurement axis of the scale 2, four main-signal interference fringes are summed up and only one main signal is detected by the main-signal receiver gratings 42.

There may be light that is made incident on the main-signal receiver grating 42 via the reference-signal pattern 25 after passing through the main-signal light source grating 32. As to this point, since the width of the reference-signal pattern 25 in the length measurement axis direction is equal to the pitch P of the main-signal scale gratings 21 to 24, the cycle of the interference fringes generated by the main-signal light source gratings 32 and the reference-signal pattern 25 is equal to that of the first main-signal interference fringe and the second main-signal interference fringe. Accordingly, a degradation of the main signal does not easily occur when the detection head 3 passes the part of the scale 2 in which the reference-signal pattern 25 is provided.

There is also light that is incident on the reference-signal receiver element 43 via the main-signal scale gratings 21 to 24 after passing through the main-signal light source grating 32. Since the main-signal receiver gratings 42 and the reference-signal receiver element 43 are arranged apart from each other in the length measurement direction, the absolute amount of light that enters the reference-signal receiver element 43 is small. Further, since the width of the reference-signal receiver element 43 in the length measurement direction is P, the reference-signal receiver element 43 constantly receives the interference fringe for one cycle and the amount of light received by the reference-signal receiver element 43 is always constant. The width of the reference-signal receiver element 43 in the length measurement direction is not limited to P and may be NP, where N is a natural number.

Figure 7:
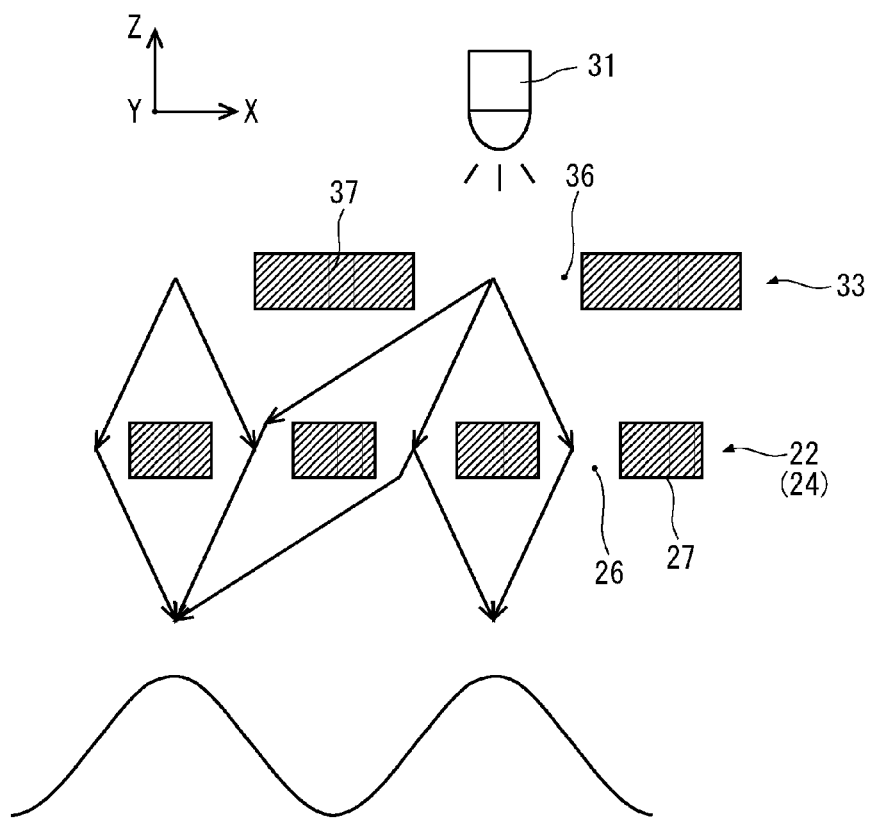
FIG. 7 is a second diagram for describing interference fringes generated by the reference-signal light source gratings and the main-signal scale gratings in the optical encoder according to the first embodiment.

Referring next to FIGS. 6 and 7, the light that has passed through the reference-signal light source gratings 33 will be described. As shown in FIG. 6, the light that the light source 31 has emitted is diffracted also in the reference-signal light source gratings 33, similar to the diffraction in the main-signal light source gratings 32, and becomes coherent light. A part of the light that has been transmitted through the reference-signal light source gratings 33 is made incident on the main-signal scale gratings 21 to 24 and the rest of light is made incident on the reference-signal pattern 25.

Since the pitch of the reference-signal light source gratings 33 is 2P and the pitch of the main-signal scale gratings 21 to 24 is P, there are two kinds of positional relationships between the reference-signal light source gratings 33 and the main-signal scale gratings 21 to 24, similar to the positional relationships between the main-signal light source gratings 32 and the main-signal scale gratings 21 to 24. In FIG. 6, the transmitting parts 26 of the main-signal scale gratings are positioned immediately below the non-transmitting parts 37 of the reference-signal light source gratings 33. In FIG. 7, the non-transmitting parts 27 of the main-signal scale gratings are positioned immediately below the non-transmitting parts 37 of the reference-signal light source gratings 33.

Since the pitch of the reference-signal light source gratings 33 is 2P and the pitch of the main-signal scale gratings 21 to 24 is P, the pitch of the interference fringes generated by the reference-signal light source gratings 33 and the main-signal scale gratings 21 to 24 is 2P. While light parts of the interference fringes are generated in every other part below the transmitting parts 26 of the main-signal scale gratings 21 and 23 in FIG. 6, light parts of the interference fringes are generated in every other part below the non-transmitting parts 27 of the main-signal scale gratings 22 and 24 in FIG. 7.

When the main-signal scale gratings 21 and 23 are positioned as shown in FIG. 6, the main-signal scale gratings 22 and 24 are naturally positioned as shown in FIG. 7. On the other hand, when the main-signal scale gratings 21 and 23 are positioned as shown in FIG. 7, the main-signal scale gratings 22 and 24 are naturally positioned as shown in FIG. 6. Since the interference fringes generated by the main-signal scale gratings 21 and 23 and the interference fringes generated by the main-signal scale gratings 22 and 24 are different from each other in phase by 180°, these fringes weaken each other. Accordingly, the light that passes through the reference-signal light source grating 33 and the main-signal scale gratings 21 to 24 to be incident on the reference-signal receiver element 43 cancel each other.

The light that has passed through the reference-signal light source grating 33 is not detected in the main-signal receiver grating 42 when it passes the main-signal scale gratings 21 to 24. However, since the main-signal scale gratings 21 to 24 are disturbed around the reference-signal pattern 25, the light beams that have passed through the reference-signal light source grating 33 do not cancel each other. Therefore, the light that has passed through the reference-signal light source grating 33 is detected by the reference-signal receiver element 43 when it passes through the reference-signal pattern 25. Accordingly, only the reference signal is detected from the light that has passed through the reference-signal light source grating 33.

In the scale 2 according to this embodiment, the reference-signal pattern 25 is formed on the length measurement axis of the main-signal scale gratings 21 to 24 arranged in parallel, and the reference-signal pattern 25 and the main-signal scale gratings 21 to 24 are on the same axis. Therefore, when there is a rotation deviation of the detection head 3 with respect to the scale 2, there is no difference between the way in which the main-signal scale gratings 21 to 24 are deviated with respect to the main-signal receiver gratings 42 and the reference-signal receiver element 43 and the way in which the reference-signal pattern 25 is deviated with respect to the main-signal receiver gratings 42 and the reference-signal receiver element 43. Accordingly, even when there is a rotation deviation of the detection head 3 with respect to the scale 2, the optical encoder 1 is able to accurately detect the reference position.

As described above, according to this embodiment, it is possible to provide the scale 2 and the optical encoder 1 capable of maintaining the accuracy of the reference position irrespective of an error in attaching the detection head.

Second Embodiment

Figure 8:
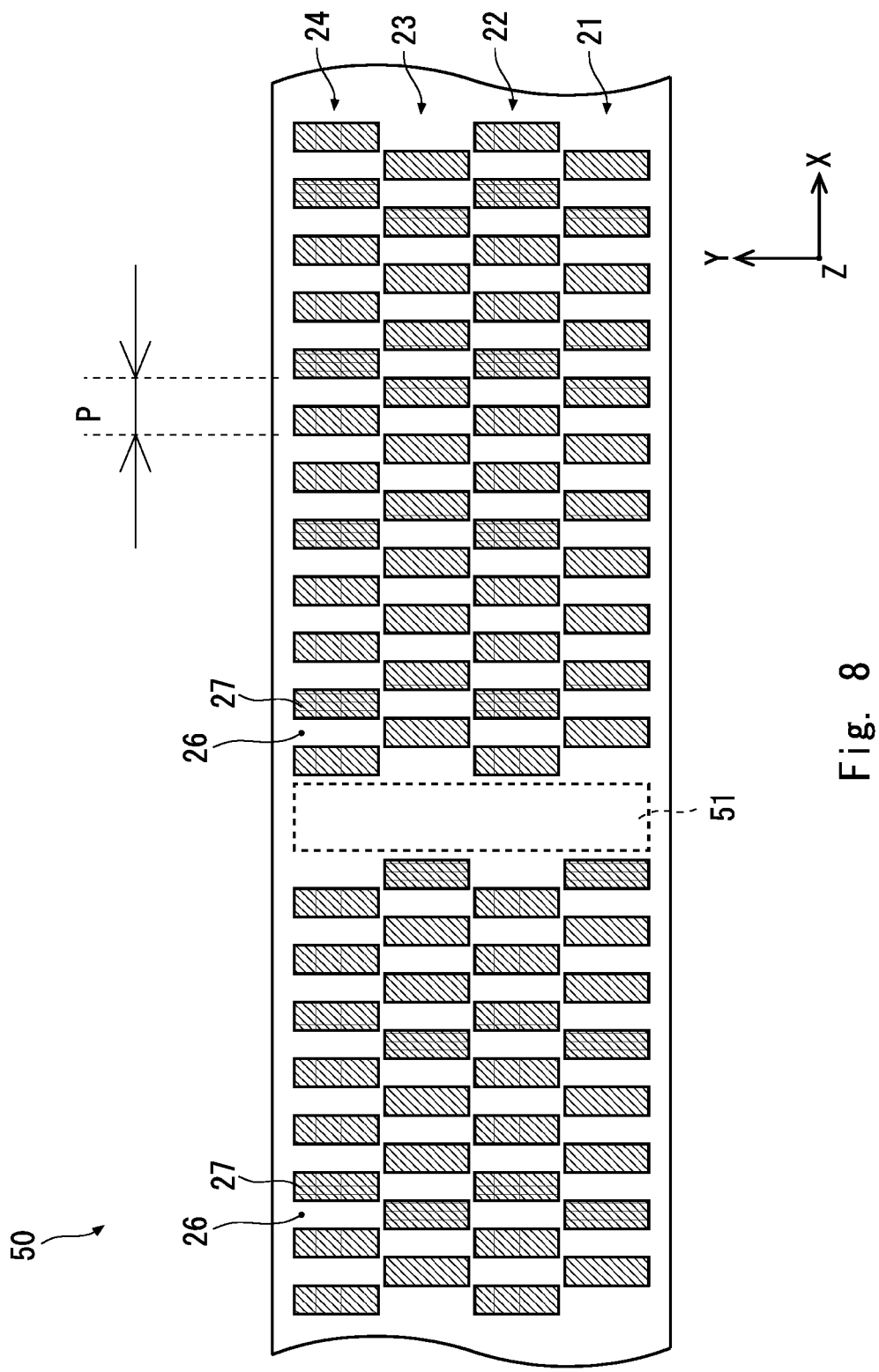
FIG. 8 is a plane view showing a scale according to a second embodiment.

An optical encoder according to a second embodiment includes a scale 50 shown in FIG. 8 and configurations of the optical encoder other than the configuration of the scale 50 are the same as those of the optical encoder 1 according to the first embodiment. The scale 50 according to the second embodiment has a configuration similar to that of the scale 2 according to the first embodiment except that a reference-signal pattern 51 is formed of transmitting parts in the scale 50, not the non-transmitting parts. The optical encoder according to this embodiment is able to detect the reference position by detecting light that has been transmitted through the reference-signal pattern 51 by the reference-signal receiver element 43.

Third Embodiment

Figure 9:
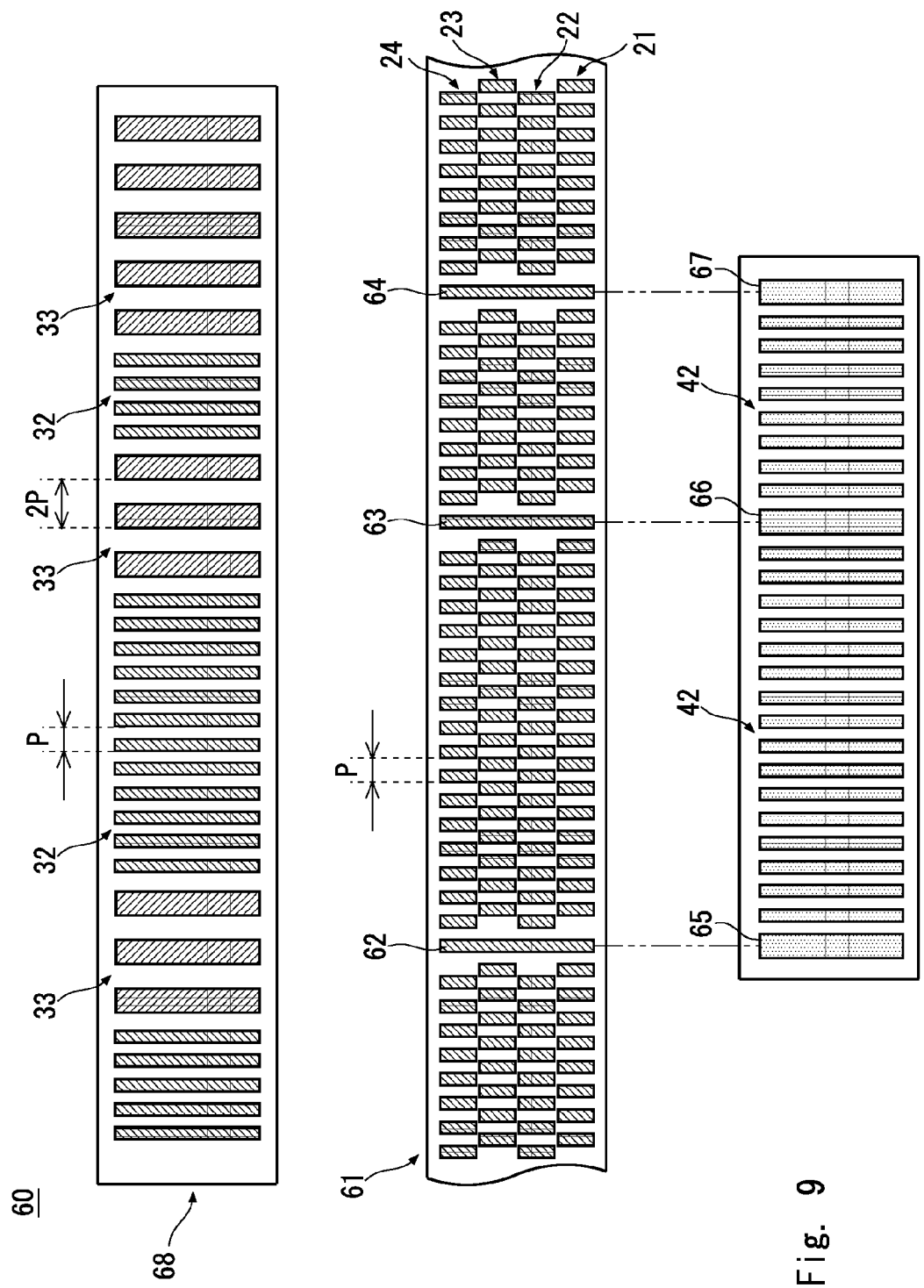
FIG. 9 is a diagram showing a positional relationship among reference-signal light source gratings, main-signal scale gratings, and a reference-signal pattern in a length measurement direction in an optical encoder according to a third embodiment.

As shown in FIG. 9, reference-signal patterns 62, 63, and 64 are arranged in a scale 61 of an optical encoder 60 according to a third embodiment, and main-signal scale gratings 21 to 24 are arranged in parts other than the reference-signal patterns 62, 63, and 64. While the intervals of the reference-signal patterns 62, 63, and 64 in the length measurement direction are different from one another in FIG. 9, the reference-signal patterns 62, 63, and 64 may be arranged at equal intervals.

In the detection head 3, three reference-signal receiver elements 65, 66, and 67 are arranged in positions corresponding to the three reference-signal patterns 62, 63, and 64, and main-signal receiver gratings 42 are arranged in the positions corresponding to the main-signal scale gratings 21 to 24. Further, a light source grating 68 included in the detection head 3 has a sufficient length in the length measurement direction so that light can be made incident on all of the reference-signal receiver elements 65, 66, and 67. The light source grating 68 includes reference-signal light source gratings 33 in positions corresponding to the reference-signal patterns 62, 63, and 64 and main-signal light source gratings 32 in positions corresponding to the main-signal scale gratings 21 to 24.

When the detection head 3 moves on the scale 2, all of the three reference-signal patterns 62, 63, and 64 and the three reference-signal receiver elements 65, 66, and 67 overlap only once.

When all of the three reference-signal patterns 62, 63, and 64 and the three reference-signal receiver elements 65, 66, and 67 overlap, the sum of the signals output from the three reference-signal receiver elements 65, 66, and 67 becomes the reference signal. This increases the intensity of the reference signal, whereby it is possible to increase the S/N ratio of the signal and the optical encoder becomes robust against noise. The number of pairs of the reference-signal pattern and the reference-signal receiver element is not limited to three, and may be two or four or more.

Modified Example 1

Figure 10:
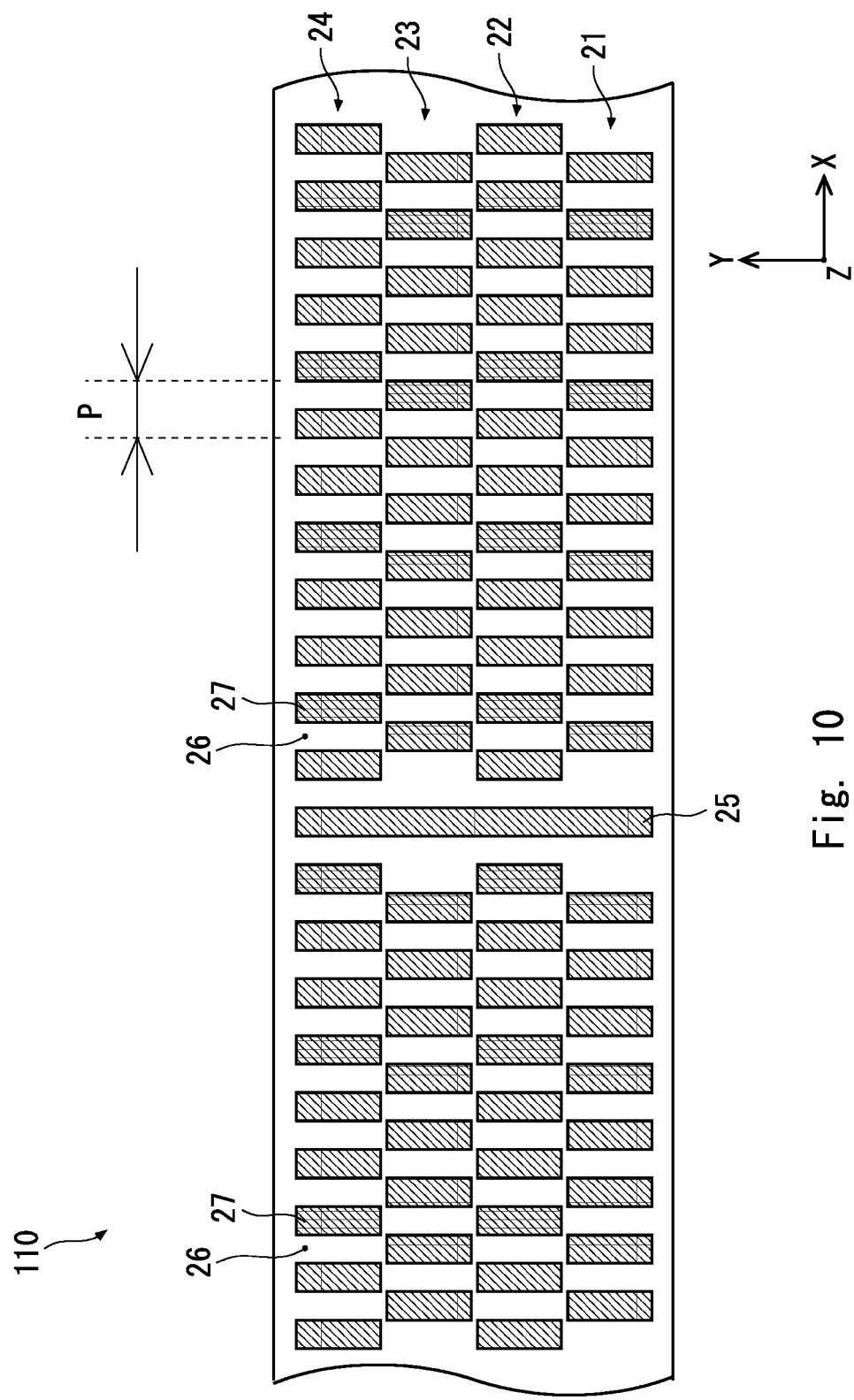
FIG. 10 is a plane view showing a scale according to a modified example 1.

FIG. 10 is a diagram showing a modified example 1 of a scale. As shown in FIG. 3, in the main-signal scale gratings 21 to 24 of the scale 2 according to the first embodiment, the arrangement of the transmitting parts 26 and the arrangement of the non-transmitting parts 27 are shifted by half a cycle between the +X direction side and the −X direction side with the reference-signal pattern 25 interposed therebetween. That is, compared to a case in which the arrangement of the non-transmitting parts 27 and the arrangement of the transmitting parts 26 in the +X direction side of the reference-signal pattern 25 are also employed in the −X direction side of the reference-signal pattern 25, the arrangement of the transmitting parts 26 and that of the non-transmitting parts 27 are inverted Meanwhile, in a scale 110 according to this modified example, the cycle of the arrangement of the transmitting parts 26 is the same as that of the non-transmitting parts 27 between the +X direction side and the −X direction side with the reference-signal pattern 25 interposed therebetween. That is, the arrangement of the transmitting parts 26 and the arrangement of the non-transmitting parts 27 in the +X direction side of the reference-signal pattern 25 are also employed in the −X direction side of the reference-signal pattern 25. That is, the reference-signal pattern 25 is formed by removing the main-signal scale gratings 21 to 24 for 1.5 pitches, and arranging one non-transmitting part that extends across the four main-signal scale gratings 21 to 24 in the middle of the removed area.

Modified Example 2

Figure 11:
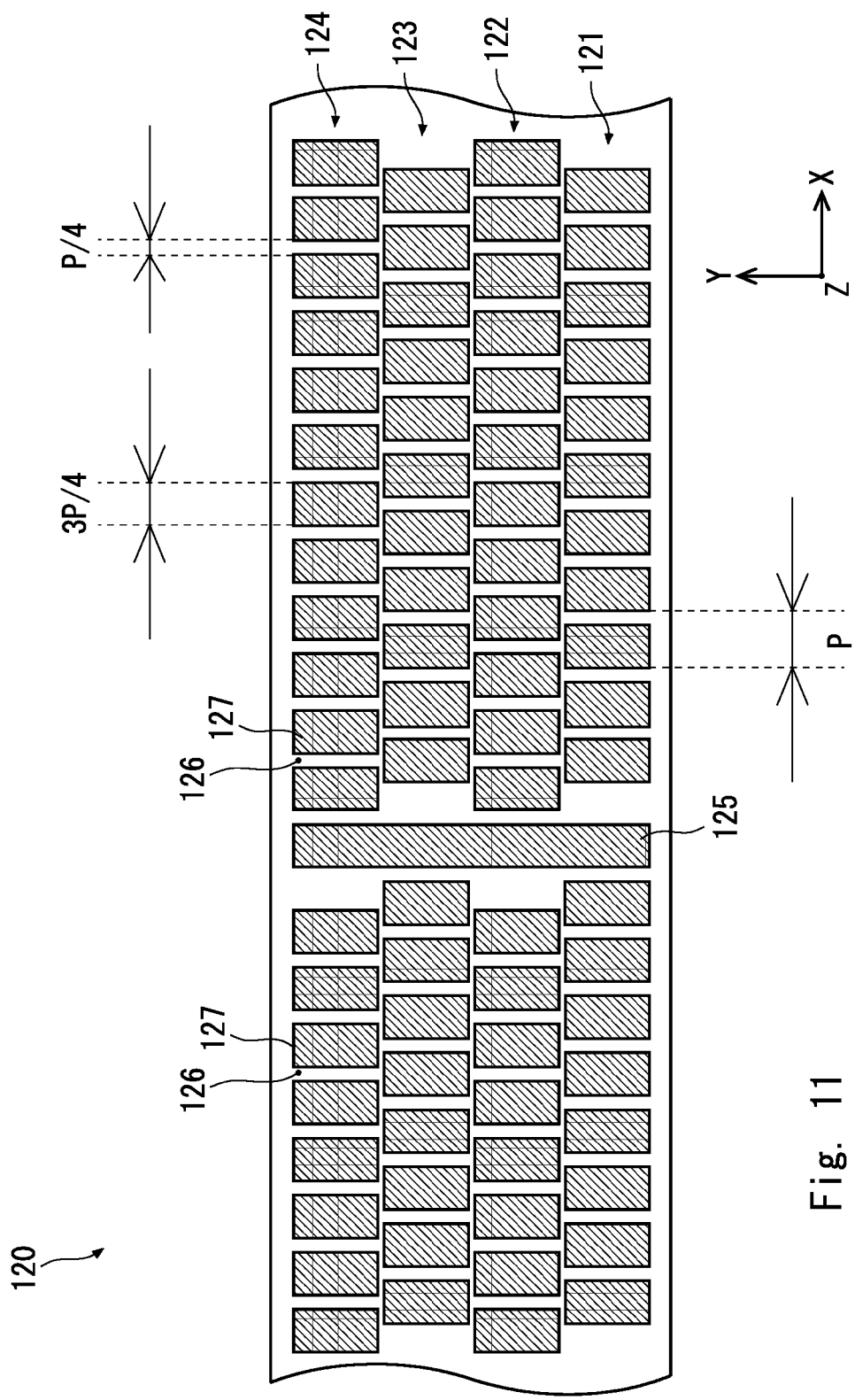
FIG. 11 is a plane view showing a scale according to a modified example 2.
Figure 12:
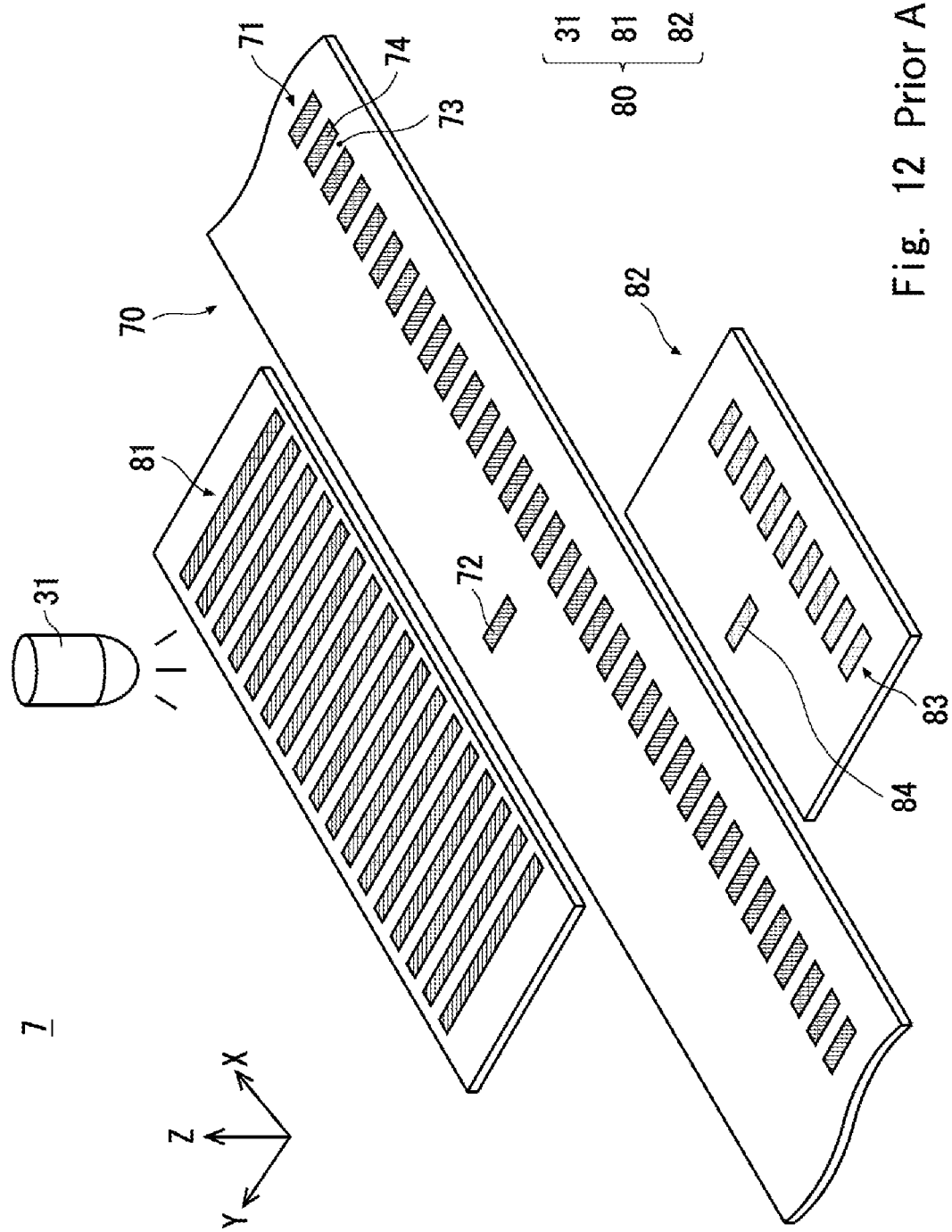
FIG. 12 is a perspective view showing an optical encoder according to a related art.
Figure 13:
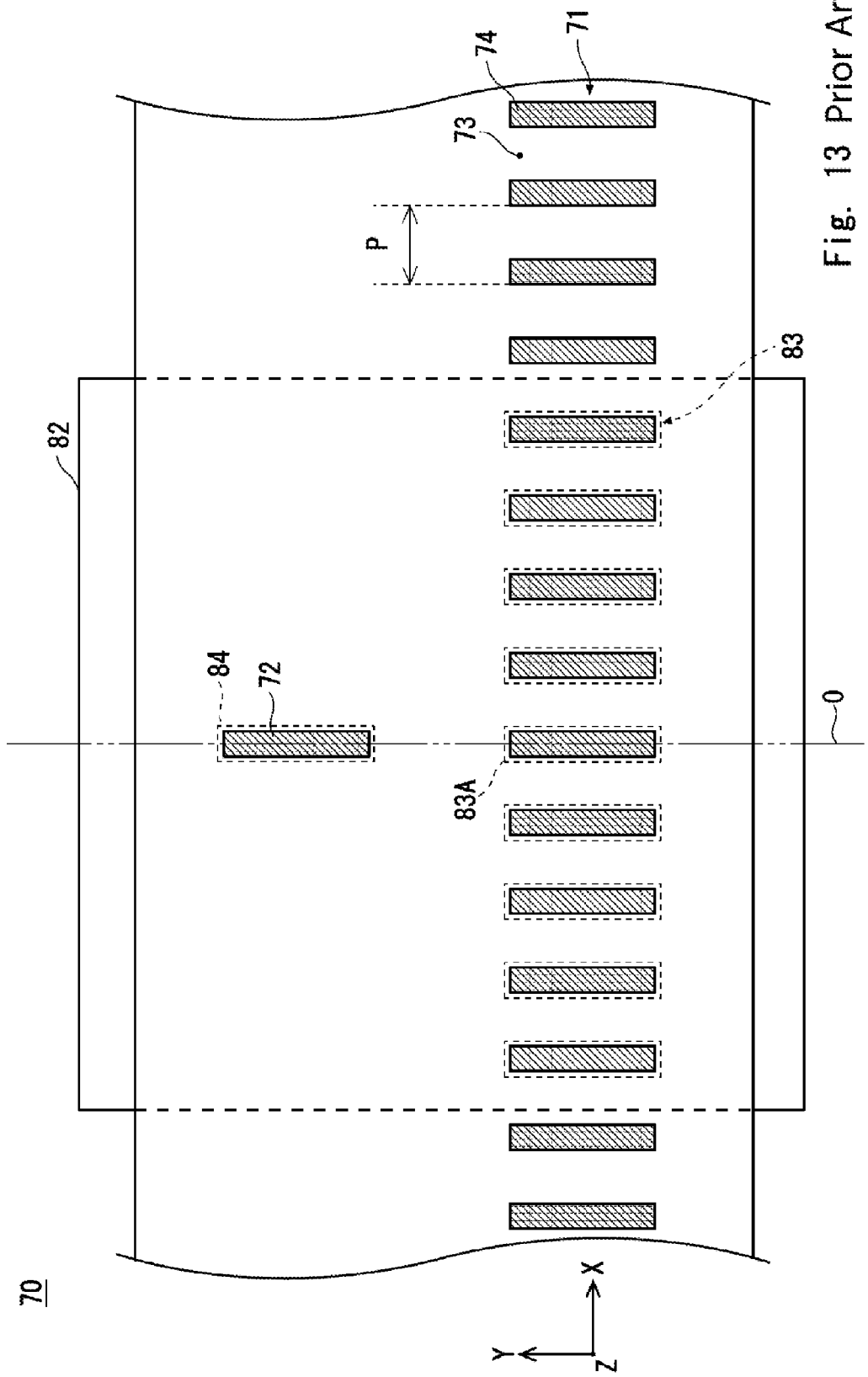
FIG. 13 is a plane view showing a scale according to the related art.
Figure 14:
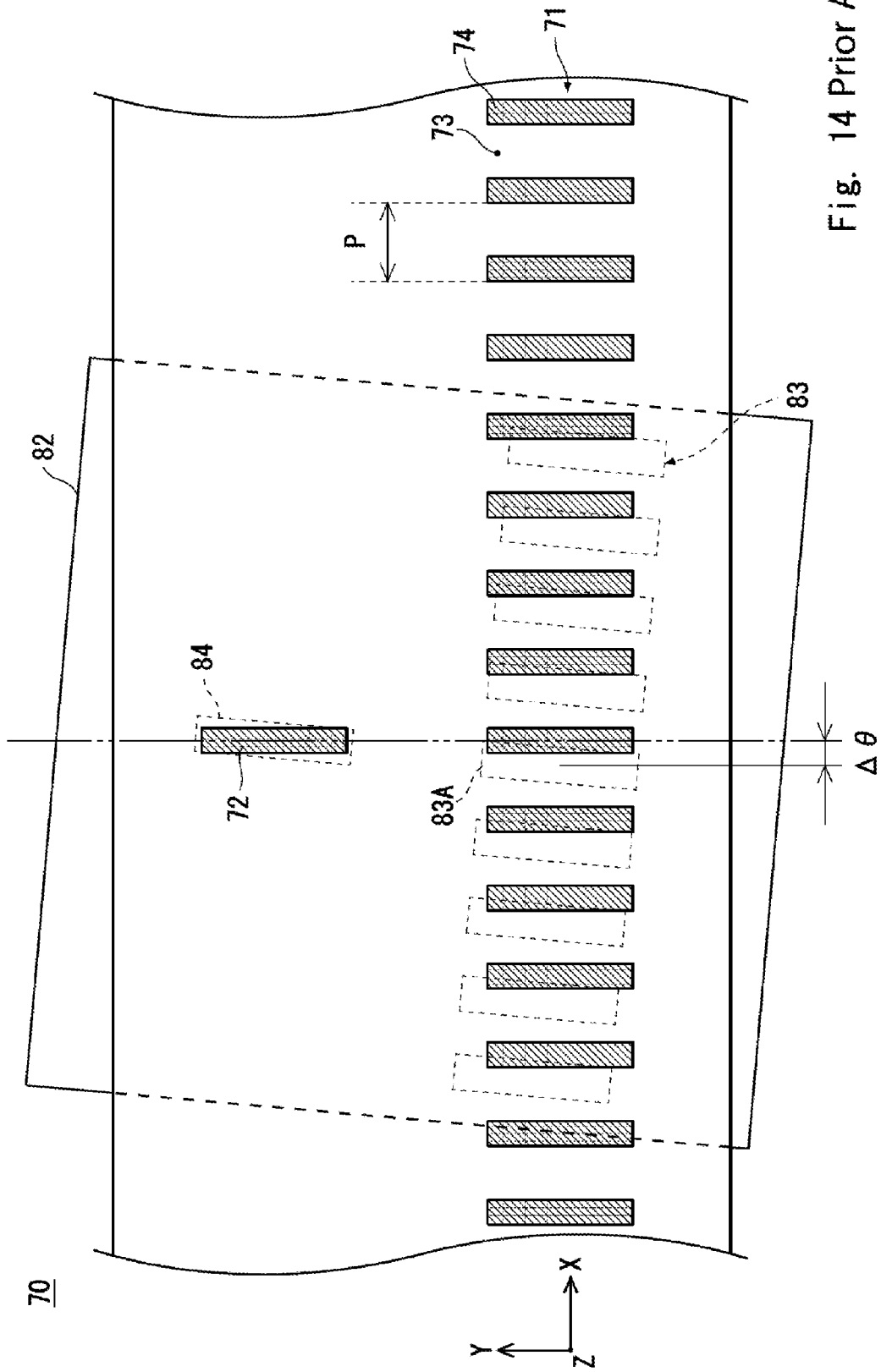
FIG. 14 is a plane view showing the scale according to the related art.

FIG. 11 is a diagram showing a modified example 2 of the scale. In both a scale 120 according to this modified example and the scale 2 according to the first embodiment, the pitch of the light parts and the dark parts of the grating patterns of the main-signal scale gratings 121 to 124 is P. However, in the pitch P, the length of transmitting parts 126 in the length measurement direction is P/4, the length of non-transmitting parts 127 is 3P/4, and the light-dark ratio in the pitch P is changed to 1:3. Similarly, the width of a reference-signal pattern 125 in the length measurement axis direction is 3P/4.

Note that the present invention is not limited to the aforementioned embodiments and may be changed as appropriate without departing from the spirit of the present invention. For example, the optical encoder according to the present invention is not limited to being applied to a transmissive encoder and may be applied to a reflective encoder. Further, the optical encoder according to the present invention is not limited to being applied to a linear encoder and may be applied to a rotary encoder.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A scale comprising first and second main-signal scale gratings having grating patterns of a predetermined pitch, and a reference-signal pattern, wherein:
    each of the two main-signal scale gratings comprises transmitting parts and non-transmitting parts, the non-transmitting parts of each of the two main-signal scale gratings are arranged at the predetermined pitch in parallel to a length measurement axis of the scale, and the non-transmitting parts of the first main-signal scale grating are shifted by one half the predetermined pitch from the non-transmitting parts of the second main-signal scale grating, and the reference-signal pattern is formed on a length measurement axis of the first main-signal scale grating and on a length measurement axis of the second main-signal scale grating.

2. The scale according to claim 1, wherein a part of the grating patterns of the main-signal scale gratings is disturbed, whereby the reference-signal pattern is formed.

3. The scale according to claim 1, wherein the reference-signal pattern extends to cross the first and the second main-signal scale gratings in a direction perpendicular to the length measurement axis of the scale, and the reference-signal pattern does not disturb the grating patterns for the first main-signal scale grating and disturbs the grating patterns for the second main-signal scale grating.

4. The scale according to claim 1, wherein the reference-signal pattern comprises a non-transmitting part that extends in the direction perpendicular to the length measurement axis of the scale and interrupts light, and the length of the reference-signal pattern in the length measurement direction is equal to the length of half the cycle of the pitch of the main-signal scale gratings.

5. The scale according to claim 1, wherein the reference-signal pattern is a transmitting part extending in the direction perpendicular to the length measurement axis of the scale.

6. The scale according to claim 1, wherein a plurality of the reference-signal patterns are provided.

7. The scale according to claim 1, wherein:
the first and second main-signal scale gratings arranged in parallel form one pair, and
a plurality of pairs of the first and the second main-signal scale gratings are arranged in parallel in the direction perpendicular to the length measurement axis of the scale.

8. An optical encoder comprising:
the scale according to claim 1;
a light source;
main-signal light source gratings that are arranged between the light source and the scale to form a main-signal interference fringe in collaboration with the main-signal scale gratings;
reference-signal light source gratings that are arranged between the light source and the scale to form a reference-signal interference fringe in collaboration with the reference-signal pattern;
main-signal detection means that detects a main signal from the main-signal interference fringe; and
reference-signal detection means that detects a reference signal from the reference-signal interference fringe, wherein:
the main-signal light source gratings comprise gratings formed to have a pitch so that two or more interference fringes formed by the two or more main-signal scale gratings and the main-signal light source gratings have the same phase, and
the reference-signal light source gratings comprise gratings formed to have a pitch so that two or more interference fringes formed by the two or more main-signal scale gratings and the reference-signal light source grating are different from each other in phase by $\frac{1}{2}$.

9. The optical encoder according to claim 8, wherein:
the main-signal light source gratings and the reference-signal light source gratings are arranged in parallel to each other in a length measurement direction of the scale,
the main-signal detection means is arranged in parallel to the main-signal light source gratings so as to be opposed to the main-signal light source gratings with the scale interposed therebetween, and
the reference-signal detection means is arranged so as to be opposed to the reference-signal light source gratings with the scale interposed therebetween.

* * * * *